United States Patent
Connolly et al.

[19]

[11] Patent Number: 5,805,929
[45] Date of Patent: Sep. 8, 1998

[54] MULTIPLE INDEPENDENT I/O FUNCTIONS ON A PCMCIA CARD SHARE A SINGLE INTERRUPT REQUEST SIGNAL USING AN AND GATE FOR TRIGGERING A DELAYED RESET SIGNAL

[75] Inventors: Brian J. Connolly; Richard J. Grimm; Steven A. Grundon, all of Chittenden County, Vt.

[73] Assignee: International Business Machines Corporation, Armonk, N.Y.

[21] Appl. No.: 593,642

[22] Filed: Jan. 29, 1996

[51] Int. Cl.$^6$ ...................................... G06F 13/00
[52] U.S. Cl. ............................ 395/869; 395/868
[58] Field of Search ................... 395/734, 677, 395/737, 733, 741, 829, 868, 869

[56] References Cited

U.S. PATENT DOCUMENTS

| | | | |
|---|---|---|---|
| 4,754,395 | 6/1988 | Weisshaar et al. | 395/680 |
| 4,870,704 | 9/1989 | Matelan et al. | 395/800 |
| 4,905,196 | 2/1990 | Kirrmann | 365/200 |
| 5,183,404 | 2/1993 | Aldous et al. | 439/55 |
| 5,218,406 | 6/1993 | Ebner | 399/11 |
| 5,293,424 | 3/1994 | Holtey et al. | 380/23 |
| 5,336,099 | 8/1994 | Aldous et al. | 439/131 |
| 5,338,210 | 8/1994 | Beckham et al. | 439/131 |
| 5,357,573 | 10/1994 | Walters | 380/25 |
| 5,359,713 | 10/1994 | Moran et al. | 395/872 |
| 5,367,689 | 11/1994 | Mayer et al. | 395/733 |
| 5,392,447 | 2/1995 | Schlack et al. | 395/800 |
| 5,530,858 | 6/1996 | Stanley et al. | 395/677 |
| 5,530,875 | 6/1996 | Wach | 395/737 |
| 5,535,420 | 7/1996 | Kardach et al. | 395/868 |
| 5,619,703 | 4/1997 | Omid et al. | 395/734 |
| 5,619,706 | 4/1997 | Young | 395/741 |
| 5,623,674 | 4/1997 | Pedrizetti | 395/733 |
| 5,634,075 | 5/1997 | Smith et al. | 395/829 |

OTHER PUBLICATIONS

Hatta, T., et al., "Power Dissipation Reduction Mechanism for Japan Electronic Industry Development Association/Personal Computer Memory Card International Association I/O Card", IBM Technical Disclosure Bulletin V37 N09, Sep. 1994, p. 39.

Riva, "General Purpose Personal Computer Memory Card International Association Interface ASIC for PC–Cards", IBM Technical Disclosure Bulletin V37 N09, Sep. 1994, pp. 515–517.

Lawrence, et al., "Designing Multiple Function PC Cards", IC Card System & Design, Jul./Aug. 1994, pp. 22–27.

Nass, "PCMCIA Fax–Modem and LAN Run Simultaneously", Electronic Design, Oct. 3, 1994, pp. 131–132.

Nass, "Multifunction Cards Pose Design Challenges", Electronic Design, Oct. 3, 1994, pp. 51–53.

*Primary Examiner*—Frank J. Asta
*Assistant Examiner*—Le Hien Luu
*Attorney, Agent, or Firm*—Whitham, Curtis & Whitham; Howard J. Walter

[57] ABSTRACT

A PCMCIA card comprises a plurality of I/O functions. Each has an interrupt signal, but the card has only one interrupt request (IREQ) line. The card is provided with an interrupt status register (ISR) to receive the interrupt signals from each of the I/O functions. This ISR allows software to determine the function that signaled the interrupt. The card is also provided with interrupt control logic (ICL) that is responsive to the interrupt status of ISR. The ICL sends an IREQ signal to a host system.

8 Claims, 4 Drawing Sheets

MULTIPLE INDEPENDENT I/O FUNCTIONS ON A PCMCIA CARD SHARE A SINGLE INTERRUPT REQUEST SIGNAL USING AN AND GATE FOR TRIGGERING A DELAYED RESET SIGNAL

BACKGROUND OF THE INVENTION

1. Field of the Invention

The present invention generally relates to multi-function cards for personal computers and, more particularly, to a PCMCIA card capable of handling multiple interrupts from a plurality of input/output (I/O) functions on a single card with only a single interrupt request (IREQ) line.

2. Background Description

PCMCIA (Personal Computer Memory Card International Association) cards, more commonly known as PC memory cards, were developed for so-called laptop or notebook computers. Today, almost every laptop or notebook computer offers one or two PCMCIA sockets. Such cards have been adapted to provide more than just added memory function. For example, facsimile modems, small computer system interface (SCSI) and local area network adapter cards have been implemented on PCMCIA cards, and interfaces for external peripherals such as compact disk read only memories (CD-ROMs) have also been implemented on PCMCIA cards. There is currently under discussion the possibility of implementing multiple functions on a single PCMCIA card, such as combining facsimile modem and network adapter functions on a single card. The original PCMCIA standard did not address building multiple functions on a single card, but at the same time, the standard has never prohibited multiple input/output (I/O) function cards.

PCMCIA card sockets in computers have a single control line to communicate interrupts back to the host system processor. This presents a number of problems. How, for example, can multiple I/O functions share a single IREQ (interrupt request) signal? Several solutions have been proposed in the art. Generally, these solutions use a "configuration register" for each I/O device with interrupt (Intr) and interrupt acknowledge (IntAck) bits. Such an approach primarily emphasizes software for card and socket services which, in turn, relies on the PCMCIA standards committee to establish standards. What is needed is a hardware solution that does not rely on an independent standards committee for implementation. Such a hardware solution should be compatible with the multiple interrupts supported by various bus architectures including, for example, the industry standard architecture (ISA) bus (an IEEE standard) and the microchannel architecture (MCA) bus.

SUMMARY OF THE INVENTION

It is therefore an object of the present invention to provide a hardware solution that allows multiple functions on a PCMCIA card to share a single interrupt line.

According to the invention, there is provided an interrupt status register (ISR) that allows software to determine the function that signaled the interrupt. Interrupt controller logic (ICL) controls the generation of the interrupt signal on the PCMCIA card. When a device on the card requires service by the host processor, it signals this requirement by generating an interrupt request. This is done by creating a transition on its interrupt signal line. The following functions are performed:

Any I/O device that generates an interrupt sets a bit in the ISR to "1". The ISR signals the ICL that an interrupt has occurred.

The ICL generates a logic transition on the IREQ line at the PCMCIA card interface.

The system software reads the ISR to determine the source of the interrupt. Then the ICL resets the IREQ line to its inactive state.

If a second function on the card signals an interrupt before the initial interrupt has been serviced, the following actions occur:

The ICL does not immediately signal the second interrupt by a transition of the IREQ line. The IREQ line is already active signaling the first interrupt.

When the first interrupt is serviced, the ICL returns the IREQ line to active.

After the IREQ line returns active, the ICL waits 500 ns and then transitions the IREQ line active again to signal the second interrupt that is pending on the card. It also sets the appropriate bit in the ISR to "1" to indicate the source of the interrupt on the PCMCIA card. The 500 ns delay before driving the IREQ line active is synchronized with the device drivers' interrupt routine. The interrupt routine resets the I/O device pending interrupt to an inactive status. Therefore, the 500 ns delay can be adjusted accordingly.

The hardware solution of the present invention has several advantages over the software solutions currently being proposed. First, additional configuration registers are not required for each I/O source. Instead, the present invention uses a single register, termed the interrupt status register (ISR) for determining the interrupt. Software is used only to set the priority for handling the interrupts. The multiple interrupts are configured into a single system interrupt and does not require any masking of interrupts. Therefore, the logic of the solution according to the invention easily maps into existing PCMCIA architecture and does not rely on any change to the PCMCIA standards. As a result, the invention works with both ISA and MCA bus architectures. Since this is a hardware solution, there is less software overhead providing a much more defined and efficient approach than solutions currently being advanced.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
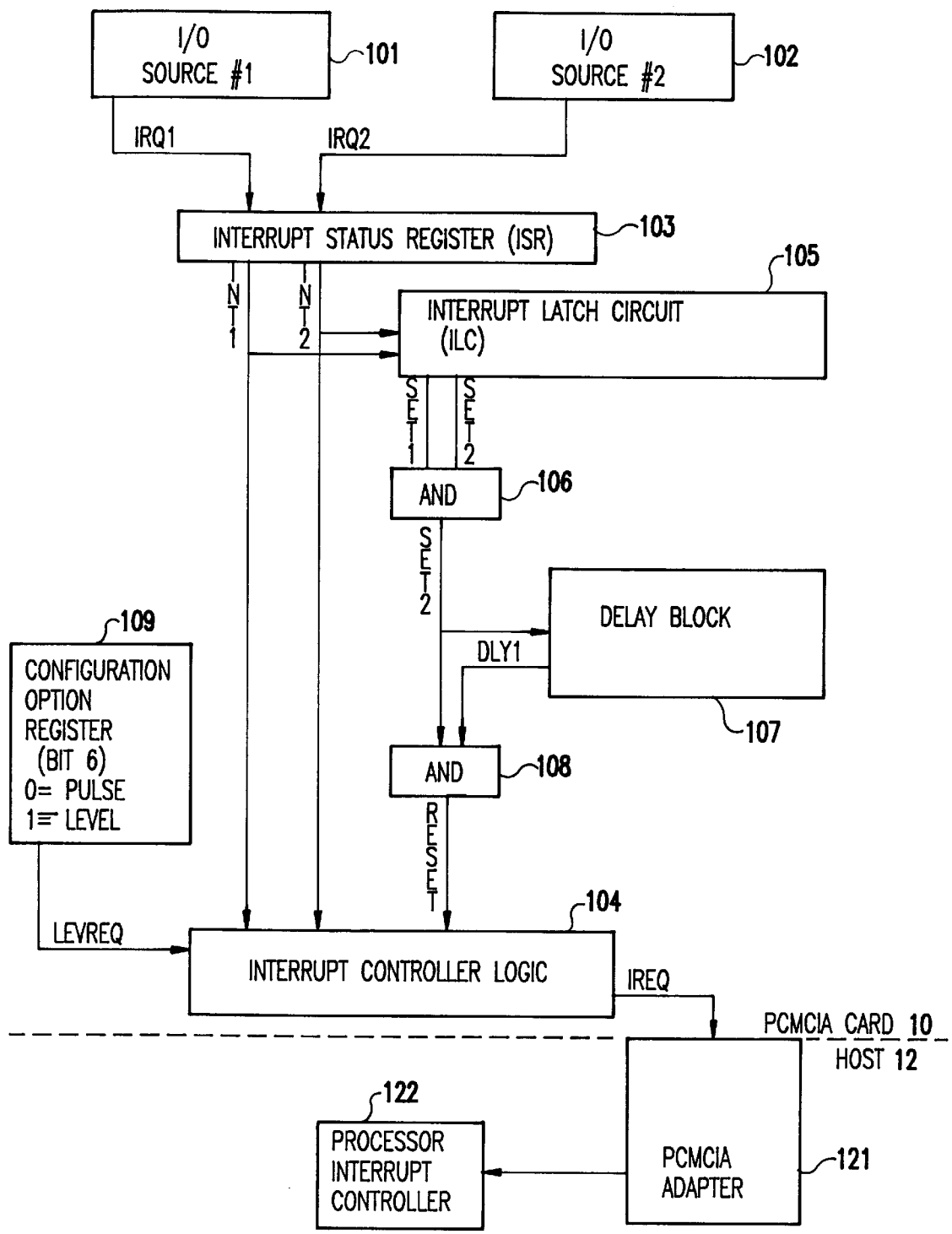
FIG. 1 is a block diagram showing a multi-function PCMCIA card according to the present invention connected to a personal computer.

Referring now to the drawings, and more particularly to FIG. 1, there is shown a block diagram of a multi-function PCMCIA card 10 according to the invention connected to a personal computer 12 (i.e., the host system). The card comprises two or more I/O functions, here illustrated as I/O source 101 and I/O source 102. Each of these I/O functions operate independently of the others and generate interrupts which need to be serviced by the host system. These interrupts are denoted as IRQ1 and IRQ2, respectively, in FIG. 1. These interrupts are input to an interrupt status register 103 (ISR) which provides an indication as to which I/O function signaled an interrupt. The interrupt signals stored in the ISR 103 are supplied to interrupt controller logic 104 (ICL) which controls the generation of the interrupt request (IREQ) signal to the host (i.e., personal computer) 12. The IREQ signal is received by the PCMCIA adapter 121 which passes the IREQ signal to the processor interrupt controller (PIC) 122, such as an 8259 interrupt controller manufactured by Intel Corp.

Multi-function I/O cards in a PCMCIA slot have to share one interrupt (IREQ) line to the host processor, and this interrupt must function in both MCA (level interrupts) and ISA (pulse interrupts) bus architectures. The newer PCI (Peripheral Component Interconnect) bus architectures follow the same interrupt scheme as MCA bus architectures. The difficulty lies in sharing interrupts in the ISA bus system. The following interrupt scheme is a proven method in successfully sharing interrupts in both MCA and ISA environments. The following description is based on the interrupt controller set in the ISA system.

As shown in FIG. 1, the two I/O sources 101 and 102 share the same interrupt line (IREQ) back to the processor. This methodology can be extended to work with more than two I/O sources, as will be apparent to those skilled in the art. The interrupt signals (IRQ1, IRQ2) from the I/O sources 101 and 102 are connected to the interrupt status register (ISR) 103 bits 1 and 2, respectively. Additional I/O sources would be assigned their unique bits in the ISR 103. The ISR 103 is a read only register that can be read by the host processor. The outputs of bits 1 and 2 generate signals INT1 and INT2, respectively. These signals are fed into the interrupt latch circuit (ILC) 105 and the interrupt controller logic (ICL) 104. When I/O source 101 signals an interrupt, bit 1 in the ISR 103 is set to a logical "1". The interrupt latch circuit (ILC) 105 and the interrupt controller logic (ICL) 104 sense this change in the ISR 103. The ICL 104 immediately drives the IREQ line low. This signals the host processor that an interrupt is pending. The interrupt latch circuit (ILC) 105 latches signal INT1. When I/O source 102 signals an interrupt, signal IRQ2 sets bit 2 in the ISR 103 to a logical "1". This generates INT2 and signals both the ICL 104 and the ILC 105 that another interrupt is pending. The ILC 105 latches signal INT2.

In this example, the second interrupt occurs while the host processor is retrieving the interrupt routine. No interrupt signal is generated at the card interface at this time. Thus, the second interrupt is not immediately signaled to the host processor. The interrupt routine needs to know which source has driven the interrupt request. The interrupt routine retrieves this information from the ISR 103. Upon reading the ISR 103, it will realize that two interrupts are pending. The interrupt routine in the device driver has to have these interrupts "prioritized". This will insure that the interrupt with the highest priority will be serviced first. This does not affect the card control circuitry even though I/O source 101 interrupt occurred first.

The proper interrupt service routine is called to clear the interrupt in I/O source 102. This clears bit 2 in the ISR 103. The ICL 104 and ILC 105 sense this change via signal INT2. The ILC 105 sets signal SET2 active low which, in combination with signal SET1, causes AND gate 106 to output signal SET12. Signal SET12 is input to delay block 107 and to one input of a second AND gate 108. After a predetermined delay, the delay block 107 provides the second output to AND gate 108 which generates the RESET signal active low to the interrupt controller logic (ICL) 104.

Figure 2:
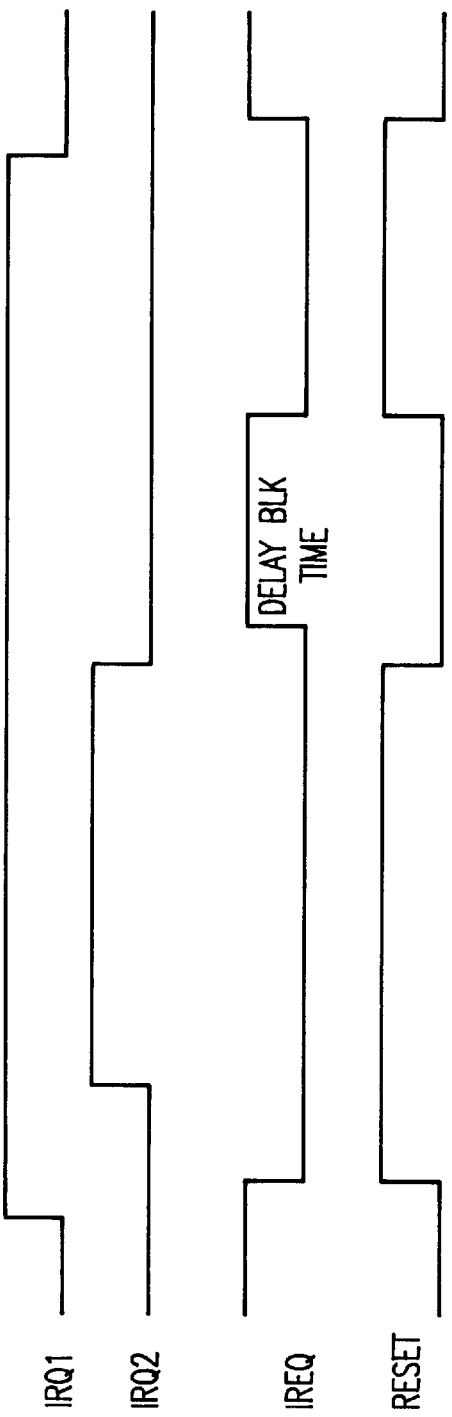
FIG. 2 is a timing diagram illustrating the operation of the PCMCIA card for two interrupts, one of which occurs while the first is still being serviced by the host system.

The processor interrupt controller (PIC) 122 drives the IREQ line high in response to the RESET signal. See the timing diagram of FIG. 2. The PIC 122 is preferably an Intel 8259 interrupt controller which channels all the interrupts in the computer back to the processor on one interrupt line. The delay block 107 keeps the RESET signal active which keeps the IREQ line high for the duration of the delay block (plus one clock cycle). The delay block 107 allows the processor interrupt controller (PIC) 122 to re-arm itself to accept the next interrupt. The delay block 107 is a critical part of the design. It allows the interrupt software routine the time to perform the end of interrupt (EOI) instruction after the interrupt source has been cleared. Once the EOI is given to the processor interrupt controller (PIC) 122, it is ready to accept another interrupt for that requesting line. The delay block 107 and the interrupt software should be designed so that the delay block 107 is greater than the interval between the instruction that clears the interrupt on the card and EOI instruction that clears the PIC. Once the delay block 107 time has finished, the interrupt from I/O source 101 drives the IREQ line low again. This signals the host processor that another interrupt is pending. The above sequence is then repeated.

In the microchannel architecture (MCA) bus system, the interrupt controller logic (ICL) 104 ignores the RESET signal input from AND gate 108. All interrupts are passed from the source though the interrupt status register (ISR) 103 onto the interrupt controller logic (ICL) 104. The interrupt controller logic 104 detects that the LEVREQ signal has been asserted from the configuration option register 109. It drives the IREQ line low and keeps it low as long as any one of the I/O sources has an interrupt pending. The configuration option register 109 insures compatibility to the PCMCIA standard. Referencing in Card Interface Section 4.15.1 of the PCMCIA PC Card Standard, Release 2.01, bit 6 of the configuration option register 109 is used by the device driver. After the device driver determines what type of system architecture the PCMCIA card is plugged into either ISA or MCA or PCI buses, it will set this bit accordingly. When this bit is set to "1", a level output is generated by the ICL as required by MCA and PCI buses.

Figure 3:
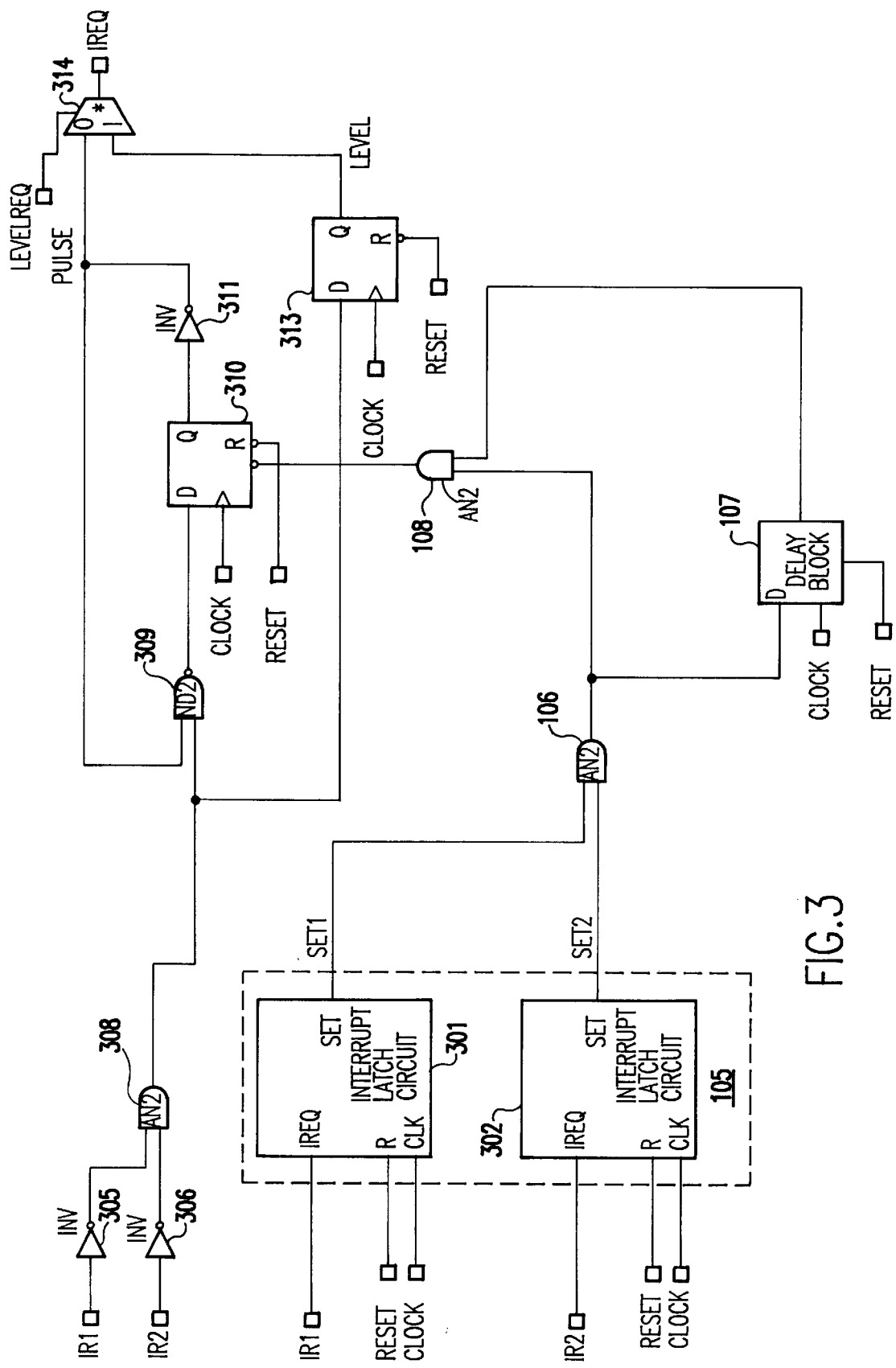
FIG. 3 is a block diagram showing the interrupt controller logic (ICL) as used in the multi-function PCMCIA card of FIG. 1.

FIG. 3 is a block diagram of one implementation of the interrupt controller logic (ICL) 104, the interrupt latch circuit (ILC) 105 and associated logic. Each IRQ signal from an I/O source is input to a corresponding one of two identical interrupt request latch circuits 301 and 302 which comprise the ILC 103. Each of these circuits also receives the RESET signal from AND gate 108, as shown in FIG. 1, and a clock signal. An example of one of the interrupt request circuits is shown in FIG. 4, to which reference is now made.

Figure 4:
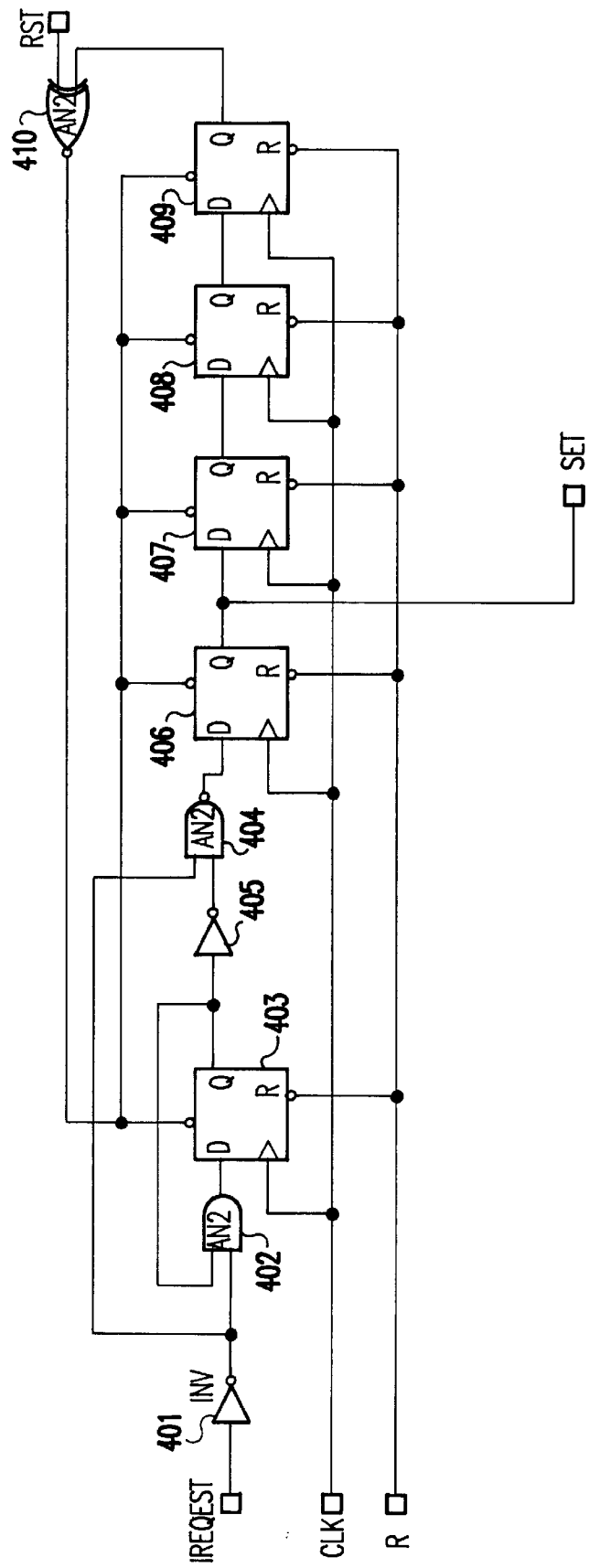
FIG. 4 is a block diagram showing the interrupt request lockout circuit used in the ICL of FIG. 2.

In FIG. 4, the IRQ signal in first inverted by inverter 401 and applied to one input of AND gate 402. The output of AND gate 402 is used to set flip-flop 403 with the next clock pulse. The output of the flip-flop 403 is fed back to the second input of AND gate 402 to inhibit further set pulses to the flip-flop. The output of inverter 401 is also input to NAND gate 404 which receives as its second input the output of flip-flop 403 inverted by inverter 405. The output of NAND gate 404 sets flip-flop 406 with the next clock pulse. Flip-flop 406 is the first of four flip-flops, including flip-flops 407, 408 and 409, connected in cascade to provide a delay. The purpose of this delay is to allow time for the delay block 107 (FIGS. 1 and 3) to become active. The delay block 107 output holds the RESET line low for 500 ns which, in turn, drives the system IREQ line high. The output of the last flip-flop 409 is input to Exclusive NOR gate 410 to generate a reset signal to each of flip-flops 403 and 406 to 409. A second input to the Exclusive NOR gate 410 receives a system reset signal which also resets flip-flops 403 and 406 to 409. The set output of the interrupt request lockout circuit is taken from the output of flip-flop 406.

Returning to FIG. 3, the set output signals of the interrupt request latch circuits, here designated as SET1 and SET2, are input to AND gate 106. The IRQ signals from the I/O sources are also inverted by respective inverters 305 and 306, the outputs of which are supplied to the inputs of an AND gate 308. The output of AND gate 308 is input to NAND gate 309, the output of which is used to set flip-flop 310 on the next clock pulse. The output of flip-flop 310 is fed back via inverter 311 to inhibit the flip-flop from receiving another set pulse until the flip-flop is reset. Meanwhile, the output of AND gate 106 is input to delay block 107 and to AND gate 108. AND gate 108 is enabled by the output of AND gate 106, and when the delay block 107 generates a delayed output, AND gate 108 provides a RESET output to flip- flop 310, resetting flip-flop 310. The output of AND gate 308 is also input to flip-flop 313 which is set on the next clock pulse. The outputs of flip-flops 310 and 313 are, respectively, a pulse and a level. These outputs are input to a multiplexer (MUX) 314 which, in response to the LEVREQ signal from the configuration option register 109, shown in FIG. 1, selects either the pulse or level output as the IREQ signal.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A PCMCIA card comprising:
   a plurality of I/O functions, each having an interrupt signal;
   an interrupt status register to receive said interrupt signals from said I/O functions;
   interrupt controller logic responsive to the interrupt status of said interrupt status register for sending an interrupt request signal to a host system processor;
   an interrupt latch circuit responsive to said interrupt status register for latching respective bits corresponding to said interrupt signals from said I/O functions;
   an AND gate generating an output when two or more bits of said interrupt latch circuit are set;
   delay means responsive to said AND gate for generating a delayed RESET signal to said interrupt controller logic; and
   a configuration option register for registering a configuration for one of at least two different bus architectures which may be implemented on the host system, said interrupt controller logic being responsive to said configuration option register to output an IREQ signal conforming to said one of said at least two different bus architectures.

2. The PCMCIA card recited in claim 1 wherein said at least two different bus architectures include an ISA and an MCA bus architecture.

3. The PCMCIA card recited in claim 1 wherein said at least two different bus architectures include an ISA and a PCI bus architecture.

4. The PCMCIA card recited in claim 1 wherein said interrupt controller logic further comprises:
   level generating means responsive to said interrupt status register for outputting a level signal;
   pulse generating means responsive to said interrupt status register for outputting a pulse signal, said pulse generating means being reset by said RESET signal; and
   multiplexing means responsive to said configuration option register for selecting one of said level signal and said pulse signal as said interrupt request signal.

5. A method of handling multiple interrupts on a multifunction PCMCIA card while selectively conforming to one of at least two different bus architectures which may implemented by a host system, said method comprising the steps of,
   setting by software a configuration option according to a bus architecture implemented by the host system;
   registering interrupt signals from each of a plurality of I/O functions on said multifunction PCMCIA card;
   signaling an interrupt status of said I/O functions;
   generating an interrupt request signal to said host system, said interrupt request signal conforming to said configuration option;
   latching in an interrupt latch, bits corresponding to said I/O functions responsive to said interrupt status signal;
   combining two or more set said latched bits to generate an output; and
   generating a delayed RESET signal from said output.

6. The method recited in claim 5 wherein said at least two different bus architectures include an ISA and an MCA bus architecture.

7. The method recited in claim 5 wherein said at least two different bus architectures include an ISA and a PCI bus architecture.

8. The method recited in claim 6 further comprising the steps of:
   responding to said signaling of an interrupt status by generating a pulse signal and a level signal; and
   selecting one of said pulse signal and said level signal according to a set configuration option, thereby generating an interrupt request signal conforming to said configuration option.

* * * * *